United States Patent
Chandrasekaran et al.

(10) Patent No.: US 9,531,799 B2
(45) Date of Patent: Dec. 27, 2016

(54) REDUCING RESTORATION TIME FOR VIRTUAL MACHINES

(71) Applicant: VMware, Inc., Palo Alto, CA (US)

(72) Inventors: Rahul Chandrasekaran, Mountain View, CA (US); Ravi Kant Cherukupalli, San Ramon, CA (US); Uttam Gupta, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 77 days.

(21) Appl. No.: 14/309,559

(22) Filed: Jun. 19, 2014

(65) Prior Publication Data

US 2015/0373096 A1    Dec. 24, 2015

(51) Int. Cl.
| | |
|---|---|
| *G06F 15/173* | (2006.01) |
| *H04L 29/08* | (2006.01) |
| *G06F 9/50* | (2006.01) |
| *G06F 9/455* | (2006.01) |
| *H04W 4/02* | (2009.01) |

(52) U.S. Cl.
CPC ....... *H04L 67/1021* (2013.01); *G06F 9/45558* (2013.01); *G06F 9/5016* (2013.01); *H04L 67/1014* (2013.01); *H04W 4/02* (2013.01); *H04W 4/023* (2013.01); *G06F 2009/45575* (2013.01); *G06F 2209/5013* (2013.01)

(58) Field of Classification Search
CPC .......... H04L 67/10; H04L 67/01; H04L 63/00; G06F 9/4558; G06F 9/4533; G06F 200/4557; G06F 2009/45595
USPC .................................................. 709/224, 226
See application file for complete search history.

(56) References Cited

U.S. PATENT DOCUMENTS

| | | | |
|---|---|---|---|
| 2003/0065712 A1* | 4/2003 | Cheung ................... | H04L 29/06 709/203 |
| 2006/0031493 A1* | 2/2006 | Cugi ....................... | H04L 67/06 709/225 |
| 2008/0114829 A1* | 5/2008 | Button .................. | H04L 67/327 709/203 |
| 2009/0172151 A1* | 7/2009 | Davis ................ | H04L 29/12264 709/224 |
| 2011/0314144 A1* | 12/2011 | Goodman .............. | G06Q 10/06 709/224 |
| 2012/0173731 A1* | 7/2012 | Lin ........................ | G06F 9/5072 709/226 |
| 2013/0060921 A1* | 3/2013 | Gadhia ................... | H04L 67/18 709/220 |
| 2013/0073670 A1* | 3/2013 | Das ....................... | G06F 9/5027 709/217 |

* cited by examiner

Primary Examiner — Duyen Doan

(57) ABSTRACT

Systems and techniques are described for restoring virtual machines. A described technique includes receiving location data specifying a location of a mobile device of a user. A first distance between the mobile device and a first data center that stores a virtual machine template and a snapshot associated with the user is determined. The snapshot represents a state of a virtual machine. A second distance between the mobile device and a second data center that is different from the first data center is determined. A determination is made that the mobile device of the user is closer to the second data center than the first data center. In response to determining that the mobile device is closer to the second data center than the first data center, the snapshot is transferred from the first data center to the second data center.

21 Claims, 4 Drawing Sheets

REDUCING RESTORATION TIME FOR VIRTUAL MACHINES

BACKGROUND

This document relates to transferring data between data centers based on a user's location.

A virtual machine (VM) is a software-based abstraction of a physical computer system. A VM is executed on a physical computer through the use of virtualization software typically referred to as a "hypervisor." A physical computer system, also referred to as a host machine, can execute one or more VMs. The hypervisor is software that is logically interposed between and interfaces with a VM and a physical computer system. In general, each VM is configured to execute an operating system, referred to herein as a guest OS, and applications.

SUMMARY

In general, one aspect of the subject matter described in this document can be embodied in a technique that includes receiving location data specifying a location of a mobile device of a user; determining, using the location data, a first distance between the mobile device and a first data center that stores a virtual machine template and a snapshot associated with the user, the snapshot representing a state of a virtual machine; determining, using the location data, a second distance between the mobile device and a second data center that is different from the first data center; determining, based on the first distance and the second distance, that the mobile device of the user is closer to the second data center than the first data center; and in response to determining that the mobile device is closer to the second data center than the first data center, causing the snapshot to be transferred from the first data center to the second data center.

These and other aspects can optionally include one or more of the following features. Aspects can include causing the virtual machine template to be transferred from the first data center to the second data center in response to determining that the mobile device is closer to the second data center than the first data center.

Aspects can include receiving, from the mobile device, a request to remotely access a virtual desktop of the user executed on a virtual machine and causing a server in the second data center to execute the virtual machine based at least in part on the snapshot transferred from the first data center. The snapshot can be transferred from the first data center to the second data center prior to receiving the request.

Receiving the location data specifying the location of the mobile device can include receiving the location data from a special purpose application executing on the mobile device. In some implementations, the snapshot includes at least one of data stored by the virtual machine or data used by the virtual machine during a previous virtual machine session. Aspects can include returning the virtual machine to the state using the snapshot and the virtual machine template.

Aspects can include receiving travel data specifying that the user is traveling to a destination location near the second data center; receiving intermediate location data specifying an intermediate location of the user; determining that the intermediate location is not within a threshold distance of the destination location; and in response to receiving the travel data and determining that the intermediate location is not within the threshold distance of the destination location, determining not to transmit the snapshot to a third data center that is located closer to the intermediate location than the first data center and the second data center.

Aspects can include receiving data indicating that the user is moving from one location to another and determining not to transmit the snapshot from the first data center to the second data center until receiving data indicating that the user has stopped moving. In some implementations, the snapshot includes data for a virtual desktop.

Particular embodiments of the subject matter described in this document can be implemented so as to realize one or more of the following advantages. Restoration time for a user's VM can be reduced by moving data used to restore the VM between data centers based on the user's location before the user submits a request to restore the VM. The restoration time can also be reduced by moving the VM data to a data center that is located closest to the user (e.g., relative to the location of other data centers that could store the VM data) prior to the user requesting to use the VM. The performance of remotely executed VMs can be increased by executing the VM at a data center that is located close to the user.

The details of one or more embodiments of the subject matter described in this document are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
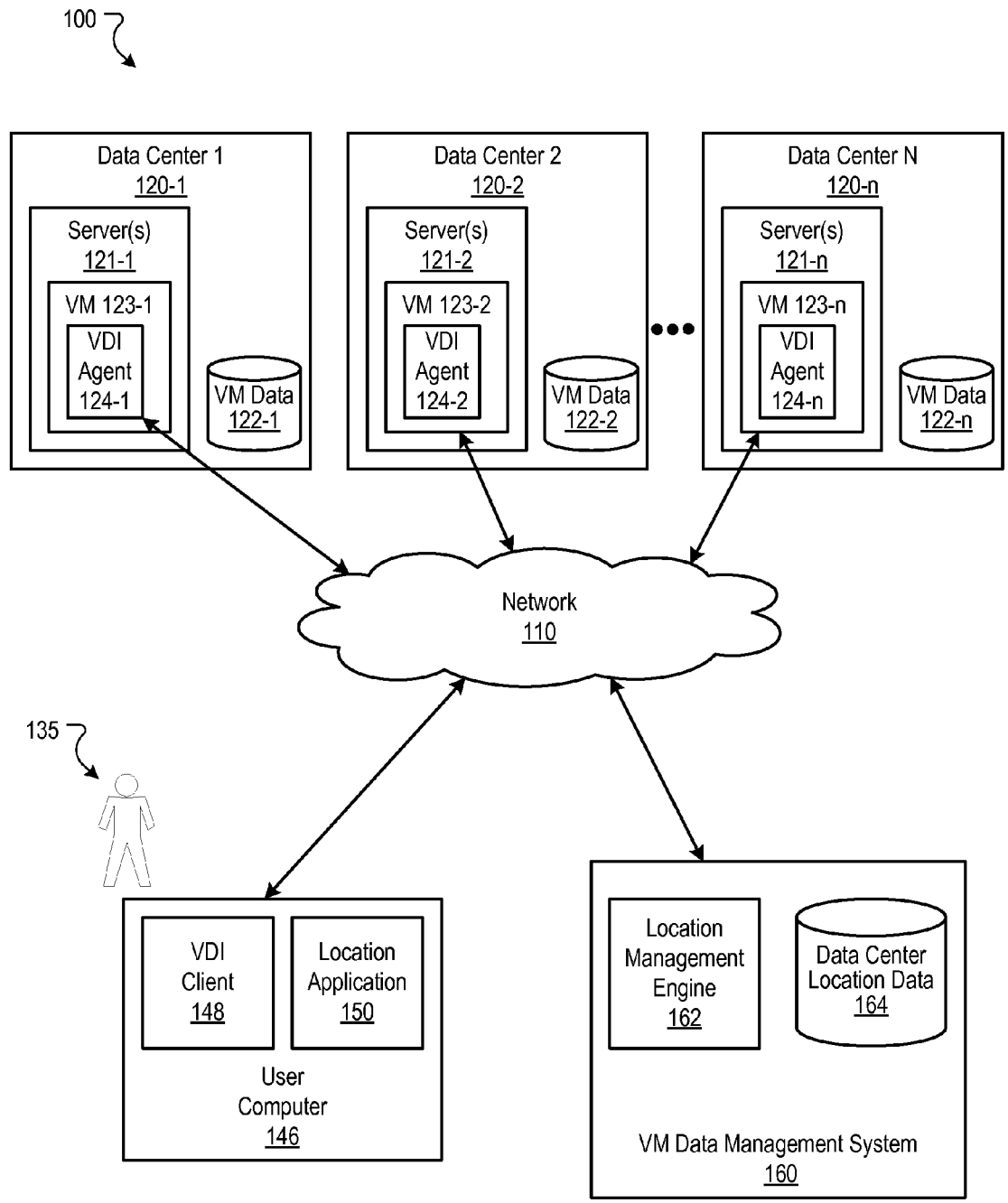
FIG. 1 shows an example environment in which VM data management system manages the location of VM data.

This document generally describes techniques for transferring data, e.g., data for a virtual desktop or another type of virtual machine (VM), between data centers or other remote data storage systems based on the location of a user. A virtual machine can be used to manage the desktop environment for a user, for example, by virtualizing components of the user's desktop. A desktop can be virtualized remotely at a remote data storage location, e.g., a remote data center.

Using remote desktop virtualization, execution of applications, including the operating system, may be handled remotely at a remote data center. Data for the user's virtualized desktop, such as settings, applications, and data files, may also be stored remotely at a remote data center. When the user accesses their computer, a virtual desktop is generated using the stored data and the execution of applications may be managed by a computer at the data center. A user interface may be presented at the user's computer that appears to function as a local desktop environment.

The VM of a user, e.g., virtual desktop, can be executed at a data center that is located near the user and data for the user's VM ("VM data") can be stored at a data center that is located near the user. However, if the user travels away from the data center and accesses a virtual desktop that is executing at the same data center, the performance of the VM may be degraded. For example, data communication between the user's computer and the computer or computers at the data center that manages the execution of the VM may be slower due to a lengthier communication path and/or an increased number of networking components located on the communication path between the two computers.

VM data for a VM can include various types of data related to the VM, e.g., data used by or stored by the VM, data used to return a VM to its previous state, virtual memory for the VM, and/or other data related to the VM. For example, VM data for a virtual desktop may include one or more snapshots that can be applied to a VM template to restore the virtual desktop to a state at which the user was last using the desktop. In general, a template for a VM can include a base VM, e.g., without any changes made by a user and/or any data stored for a user. For example, a template for a virtual desktop may include the operating system for the virtual desktop and other applications that are standard for the template. The snapshots may indicate changes made to the template, for example, by a user of the virtual machine.

The VM data can include a sequence of snapshots generated over time to capture changes that the user has made to an original VM template. The snapshots can indicate one or more states of the VM when the snapshot was generated, e.g., a power state and/or device state, and/or applications or documents that were open at the time the snapshot was generated. This VM data can be used to return the virtual desktop to its previous state, e.g., with the same applications and/or documents opened.

When the user remains in the same location, the VM data may be stored at a data center near that location to ensure fast access to the VM in its previous state. However, if the user travels to another location, such as to another country, it may take a significant amount of time to communicate data between the data center executing the VM and the user's device. Systems and techniques described herein can transfer the VM data between data centers based on the user's location so that the user's VM can more quickly be restored to its previous state and so that data can be communicated more quickly between the VM and the user's device.

For example, user A may typically work in San Francisco, Calif., which is near data center A. VM data for the user may be stored in data center A due to data center A being the closest data center to the user. User A may travel to New York City, which is closer to data center B than to data center A. In response to receiving location data specifying that the user is in New York City, a system may transfer the VM data for the user from data center A to data center B so that the user's device can more quickly retrieve the VM data than if the VM data was transmitted to the device from data center A. In some implementations, the system may transfer the VM data to data center B based on the location data before the user requests to use the virtual machine using the device. For example, the system may receive location data from an application running on the user's computer or mobile communication device, e.g., smartphone, and transfer the VM data before the user attempts to use the VM.

Although the systems and techniques described herein are described in terms of transferring VM data, other types of data can also be transferred based on a user's location. For example, images, videos, documents, audio files, or other data files of a user may be transferred between data centers based on the user's location so that the user may have quicker access to the data files.

FIG. 1 shows an example environment 100 in which a VM data management system 160 manages the location of VM data. The example environment 100 includes a network 110, e.g., a local area network (LAN), wide area network (WAN), e.g., the Internet, a cellular data network, or a combination thereof. The network 110 communicatively connects user computers, such as user computer 146, with data center computers, such as servers 121-1-121-n located at data centers 120-1-120-n. The data centers 120-1-120-n are generally located at different geographic locations. For example, the data center 120-1 may be located in California, while the data center 120-2 may be located in another state or in another country. The data centers 120-1-120-n can host user desktop environments and enable users to connect to their desktop environments remotely in a Virtualized Desktop Infrastructure (VDI) environment.

The user computer 146 can be a portable computer, e.g., a laptop computer or a tablet computer, or other appropriate mobile electronic device, such that a user 135 can take the computer 146 to various locations. The user computer 146 includes a VDI client 148 that provides a user interface for the user 135 to interact with a VM that is hosted on a remote computer, e.g., a server 121-1-121-n located at a data center 120-1-120-n. As described in more detail below, the VDI client 148 can send commands submitted at the computer 146 to the server for execution by the VM and receive data to be presented at the computer 146 from the VM executing at the server.

The computer 146 also includes and/or executes a location application 150 that can, e.g., with the consent of the user 135, send location data to the VM data management system 160. The location data can specify a current geographic location of the computer 146. For example, the location application 150 can obtain the location data from a Global Positioning System (GPS) application installed on the computer 146 and provide the location data to the VM data management system 160. In addition, or in the alternative, the location application 150 may use available wi-fi signals to determine the location of the computer 146.

In some implementations, the location application 142 is a special purpose application that transmits the location data to the VM data management system 160. For example, the user may download and install the location application 150 from a VM provider, e.g., a VM provider that owns or that is associated with the VM data management system 160, so that the VM provider can transfer the user's VM data to an appropriate data center. The location application 150 can provide the location data on a periodic basis, e.g., once per minute, hour, or other suitable increment of time, or in response to a user command to send the location data. The VM data management system 160 can use the location of the computer 146 as a proxy for the user's location.

In some implementations, a location application may be installed another device of the user, e.g., a smartphone, to provide the location of the computer 146 to the VM data management system 160 in a similar manner. For example, the user may have a smartphone that includes a special purpose location app that provides location data to the VM data management system 160. The location of the smartphone may be used as a proxy for the location of the user, and thus the location of the computer 146.

In some implementations, the location application 150 can interact with the user 135, for example, to receive preferences and/or travel data from the user. As described in more detail below, the user 135 may be prompted to select whether to transfer VM data to another data center. The location application 142 may also allow the user to provide travel data specifying a destination location to which the user will be traveling. The location application 142 can provide the received data to the VM data management system 160 for use in determining whether to transfer the user's VM data.

VM(s) of the user 135 may be executed remotely at one or more data centers 120-1-120-n and VM data for VM(s) of the user 135 may be stored in one or more data centers. Each data center 120-1-120-n can include one or more servers 121-1-121-n and a VM data storage unit 122-1-122-n for storing VM data for one or more users. The servers 121-1-121-n can include hardware and/or software for executing VMs 123-1-123-n. For example, each server 121-1-121-n can execute a hypervisor that manages a virtual machine execution space within which one or more VMs 123-1-123-n may be instantiated and executed by the server.

Each VM 123-1-123-n can include a VDI agent 124-1-124-n, respectively. The VDI agents 124-1-124-n can interact with VDI clients executing on user devices, e.g., the VDI client 148 executing on the computer 146. For example, the VDI agents 124-1-124-n may encode and send display information, e.g., framebuffer data, to the VDI client 148. In turn, the VDI client 148 can cause the computer 146 to display the received display information. In addition, the VDI client 148 can detect input events at the computer 146, e.g., mouse clicks, touch input, and so on, and send data specifying those inputs to the VDI agent 124-1-124-n of the appropriate VM 123-1-123-n. The VDI agent 124-1-124-n may then provide the received data to the VM 123-1-123-n.

As described above, VM data for a VM may be stored in a VM data storage unit 122-1-122-n. In some implementations, the server that executes a VM may generate and store snapshots for the VM, e.g., periodically or in response to events. For example, the server may generate and store a snapshot of the VM in response to receiving data from the computer 146 to pause or terminate the use of the VM. For a virtual desktop, the computer 146 may send such VM data to the server in response to receiving, e.g., from the user 135, a command to shut down the computer 146 or go into a power save mode, or in response to the user closing a laptop computer.

A snapshot for a VM may include state data that specifies one or more states of the VM, such as the VM's power state, e.g., powered-on, powered-off, or suspended, and/or the state of one or more virtual devices used by the VM, e.g., a virtual driver. For a virtual desktop, the state data may also specify applications that were active, documents or files that were open, web browsers that were open and any web pages that were open in the web browser, and other data to return the virtual desktop to its previous state. When the VM is returned to the previous state, the open applications, files, and/or browsers can be restored so that the user 135 can resume the previous session.

The snapshot of a VM may also include data used by or stored by the VM. For example, the snapshot may include data files for the VM, e.g., virtual disks and/or virtual memory. For virtual desktops, the snapshot may include data files accessed and/or stored by the user, such as documents, images, videos, contact lists, bookmarks, and/or other types of data files.

The VM data management system 160 can manage the location at which VM data—e.g., snapshot(s) for the VM—is stored for users based on the location of the users. In some implementations, the VM data management system 160 is implemented as one or more software programs executing on one or more computers in one or more physical locations. The VM data management system 160 includes a location management engine 162, e.g., implemented using software, that can transfer VM data for a user 135 from one data center to another data center based on the user's location. For example, the VM data for the user 135 may initially be stored in the VM data storage unit 122-1 at the data center 120-1.

If the user 135 travels to another location such that the user is located closer to the data center 120-2 than the data center 120-1, the location management engine 162 may determine to transfer the VM data for the user 135 from the VM data storage unit 122-1 of the data center 120-2 to the VM data storage unit 122-2 at the data center 120-2. In this way, the user's computer 146 can more quickly access the VM in its previous state and communicate data more quickly with the VM. For example, due to the shorter distance between the user's computer 146 and the VM data storage unit 122-2 relative to the distance between the computer 146 and the VM data storage unit 122-1, data can be more quickly communicated between the computer 146 and the server 121-2 during execution of the VM than between the computer 146 and the server 121-1 due to the difference in distance.

In some implementations, a server at the data center that receives the snapshot(s) can return the VM to its previous state using snapshot(s) for the VM and a template for the VM. The server can combine the template with the snapshot(s) to return the VM to a previous state specified by the snapshot(s). The server may combine the template with the snapshot(s) by modifying one or more files of the VM based on the snapshot(s). For example, as part of the combining, the server may modify a virtual disk of the template based on a virtual disk data file of a snapshot.

To determine whether to transfer the VM data, the location management engine 162 can retrieve the location of data centers 120-1-120-n from a data center location data storage unit 164. The location management engine 162 can also receive location data specifying the location of the user 135, for example, from the computer 146 or from another device of the user. The location management engine 162 can then determine the distance between the user 135 and the data centers 120-1-120-n to determine which data center is closest to the user 135. If a data center is closer to the user 135 than the data center at which the user's VM data is currently stored, the location management engine 162 may cause the user's VM data to be transferred to the closer data center. For example, the location management engine 162 may send, to the server at the data center at which the VM data is stored, a request to transfer the VM data to the closer data center.

In some implementations, a remotely executed VM may be migrated to another data center while the VM is active. For example, the user may be using the VM while traveling as a passenger in a car, train, or airplane. While traveling and using the VM, the user may move closer to another data center other than the one on which the VM is currently executing. To maintain the performance of the VM and maintain adequate data communication between the VDI client 148 and the server executing the VM, the VM may be migrated to the data center that is located closest to the user.

To migrate the VM from a first data center to a second data center, a server that is currently executing the VM at the first data center may pre-copy at least a portion of the VM's memory to a server at the second data center. The server at the first data center may also suspend the VM and transfer non-memory state information for the VM to the server at the second data center. The non-memory state information can include the contents of the VM's virtual disk. The VM may be briefly unavailable to the memory while the non-memory state information is transferred. The VM can then be resumed at the second data center using the state information and the pre-copied memory. Any additional memory that needs to be copied from the first data center can then be transferred to the second data center. An example process for migrating a VM is described in U.S. Pat. No. 7,680,919, which is incorporated herein by reference.

Figure 2A:
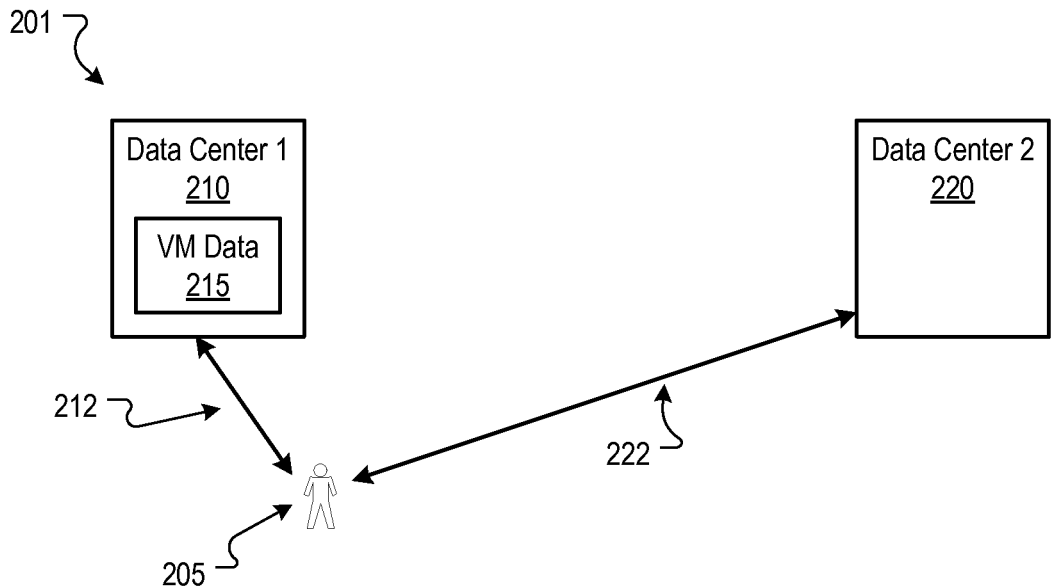
FIGS. 2A and 2B are block diagrams that show the transfer of VM data from a data center to another data center based on the location of a user.
Figure 2B:
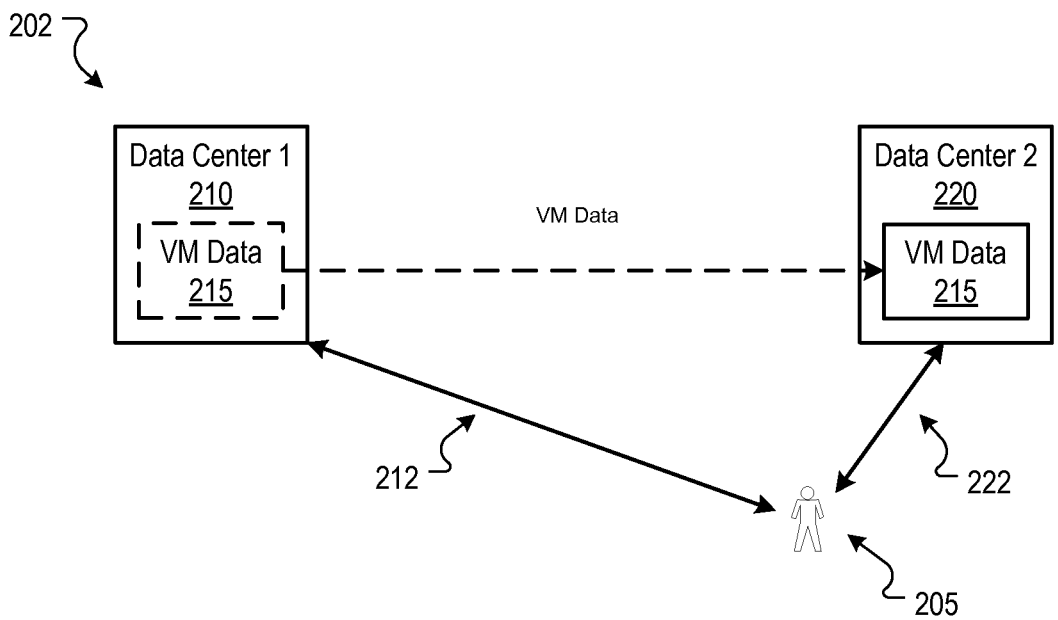

FIGS. 2A and 2B are block diagrams 201 and 202, respectively, that show the transfer of VM data from a data center to another data center based on the location of a user. In the block diagram 201, VM data 215 for a user 205 is stored at a data center 210. For example, the data center 210 may be located near a location at which the user 205 typically uses a VM associated with the VM data. A distance 212 separates the user 205 from the data center 210. Another data center 220 in which the VM data 215 could be stored is located at a distance 222 from the user 205. As shown in FIG. 2A, although not to scale, the distance 222 is greater than the distance 212.

In the block diagram 202, the user 205 has moved to a location that is closer to the data center 220 than the data center 210. For example, the distance 212 is now greater than the distance 222. In response to determining that the user 205 is closer to the data center 220 than the data center 210, a location management engine, e.g., the location management engine 162 of FIG. 1, can cause the VM data 215 to be transferred from the data center 210 to the data center 220.

In some implementations, techniques can be used to prevent unnecessary or excessive data transfers. For example, a user may be traveling from one destination to another by car. Rather than transfer the VM data to each data center that becomes the data center closest to the user while the user is traveling, the location management engine 162 may wait until the user has reached a particular destination location or stopped moving to transfer the VM data to the data center closest to the destination location or the current location of the user. This technique can be accomplished any of a variety of ways. For example, referring back to FIG. 1, the user 135 may provide travel data specifying the destination location to the location management engine 162, e.g., using the location application 142. Based on receipt of this travel data, the location management engine 162 may determine not to transfer the VM data to data centers along the user's route and instead transfer the VM data to a data center located near the destination location. The VM data can be transferred to the data center near the destination location, e.g., the data center that is closest to the destination location, in response to determining that the user is located at or near the destination location, that the user 135 is located within a threshold distance of the destination location, that the user 135 is currently traveling to the destination location, or that the user 135 will be traveling to the destination location within a threshold amount of time, e.g., within an hour.

In some implementations, the user may use the location application 142 to provide travel data that specifies a destination location and a time and/or date at which the user plans to be at the destination location. For example, the user may specify an intention to be in Chicago on Friday. In response, the location management engine 162 may cause the VM data to be transferred in advance of the specified time or date. Or, the location management engine 162 may monitor the location of the user and transfer the VM data in response to the user being within a threshold distance of the destination location, e.g., within a few miles of Chicago.

The location management engine 162 may also monitor the location data of the user 135, e.g., with the user's consent, to determine whether the user 135 is currently moving with or without knowing the user's final destination. If the user 135 is moving, the location management engine 162 may determine not to transfer the VM data until the user 135 has stopped moving, e.g., for at least a threshold amount of time, even if the user 135 travels to a location that is closer to a different data center than the data center at which the VM data is stored. In this way, the VM data is not transferred multiple times for a single trip.

The user 135 may also be prompted to select whether to have the VM data transferred, for example, in response to a determination that the user 135 is located closer to a different data center than the data center where the user's VM data is stored. For example, the location management engine 162 may determine that the user 135 is located closer to the data center based on location data provided by the user's computer 146. In response to the determination, the location management engine 162 may send a request to the location application 142 of the user's computer 146 to inquire whether the user 135 would like for the VM data to be transferred to the closer data center. In turn, the location application 142 can prompt the user to select whether to have the VM data transferred and send data specifying the user's selection to the location management engine 162. If the user 135 selected to have the VM data transferred, the VM data management system 160 can cause a server at the data center storing the VM data to transfer the VM data to a server at the closer data center.

If a request is received to access the VM, the VM data may be transferred irrespective of the destination or the fact that the user is moving. For example, the location management engine 162 may initially determine not to transfer the VM data based on a determination that the user 135 is in route to a destination location, but is closer to a different, intermediate data center than the data center near the destination location. However, if the user 135 is attempting to access the VM, the VM data can be transferred to the intermediate data center so that data can be transferred between the user's computer 146 and a data center more quickly.

Figure 3A:
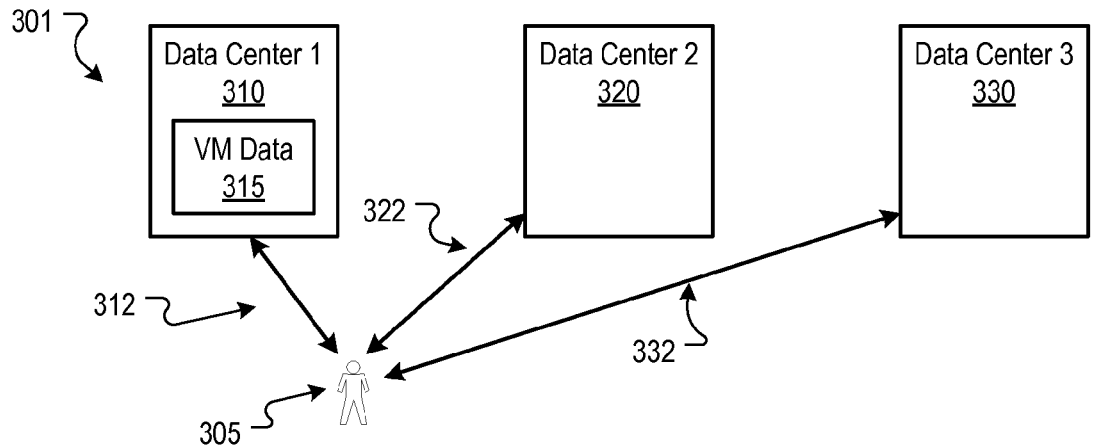
FIGS. 3A-3C are block diagrams that show the transfer of VM data from a data center to another data center based on the location of a user.
Figure 3B:
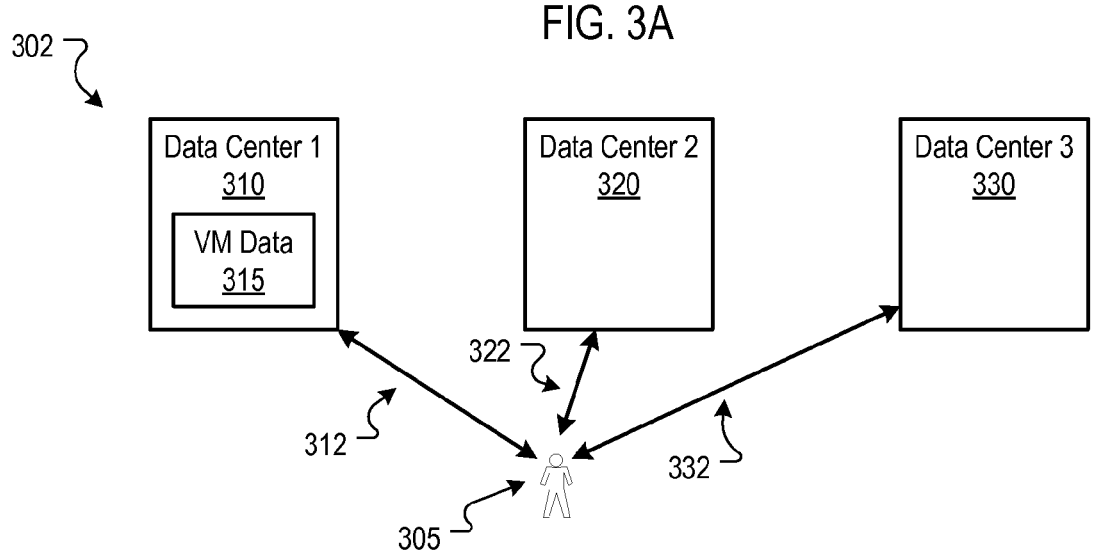
Figure 3C:
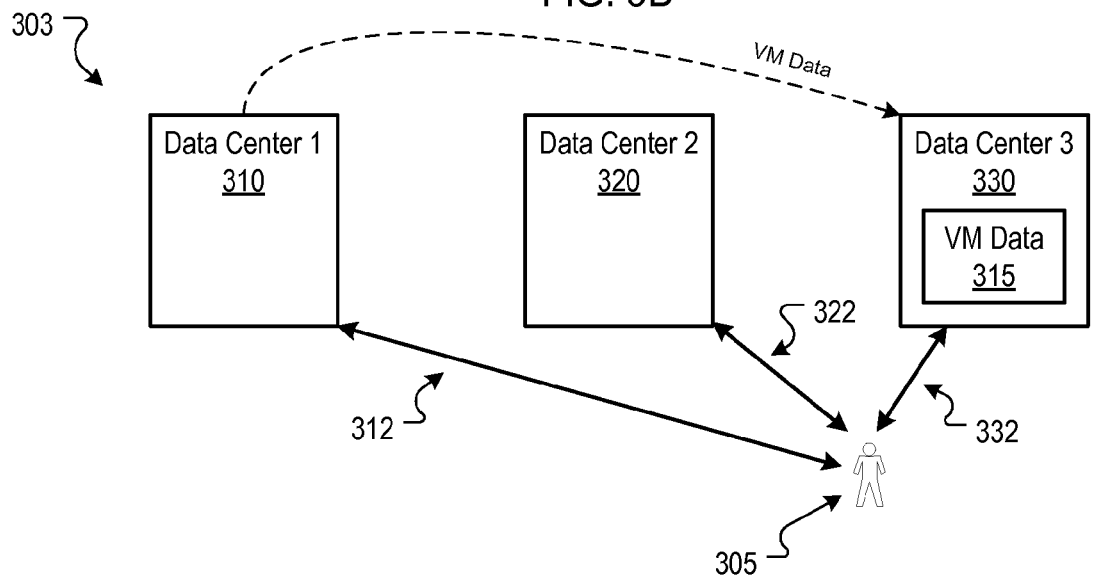

FIGS. 3A-3C are block diagrams 301-303, respectively, that show the transfer of VM data from a data center to another data center based on the location of a user. In the block diagram 301, VM data 315 for a user 305 is stored at a data center 310. For example, the data center 310 may be located near a location that the user 305 typically uses a VM associated with the VM data. A distance 312 separates the user 305 from the data center 310. Two additional data centers 320 and 330 in which the VM data 315 could be stored are located at distances 322 and 332, respectively, from the user 305. As shown in FIG. 3A, although not to scale, both distances 322 and 332 are greater than the distance 312.

In this example, the user 305 has specified an intention to travel to a location that happens to be closer to the data center 330 than the data centers 310 and 320. As shown in the block diagram 302, the user 305 travels along a path that places the user 305 closer to the data center 320 than the data centers 310 and 330. While the user 305 is traveling, a computer or mobile communication device of the user 305 can send location data to a location management engine, e.g., the location management engine 162 of FIG. 1. In response to receiving location data that indicates that the user 305 is located closer to the data center 320 than the data centers 310 and 330, the location management engine 162 can determine whether to transfer the VM data 315 from the data center 310 to the data center 320. As the user 305 has specified an intention to travel to the location near the data center 330, the location management engine 162 may determine not to transfer the VM data to the data center 320.

Instead, as shown in the block diagram 303, the location management engine 162 may transfer the VM data 315 to the data center 330. For example, the location management engine 162 may cause the VM data 315 to be transferred to the data center 330 in response to determining that the user 305 is within a threshold distance of the user's intended location or within a threshold distance to the data center 330. Or, the location management engine 162 may cause the VM data 315 to be transferred to the data center 330 in response to receiving the data indicating that the user 305 is going to travel to the location near the data center 330. For example, the user 305 may specify a date and/or time that the user 305 will be at that location. In response, the location management engine 162 may cause the VM data 315 to be transferred to the data center 330 prior to that date and/or time.

A similar process may occur in response to determining that the user 305 is moving. For example, the location management engine 162 may use location data provided by the user's mobile communication device to determine that the user is moving, e.g., by determining that the user locations received from the mobile communication device is changing at a rate that exceeds a threshold rate. The location management engine 162 may also determine that the user 305 is located closer to the data center 320 than the data center 310. The location management engine 162 may determine not to transfer the VM data 315 to the data center 320 while the user 305 is moving. If the user 305 stops moving at a location that is closer to the data center 330 than the other data centers 310 and 320, the location management engine 162 may cause the VM data 315 to be transferred to the data center 330.

Figure 4:
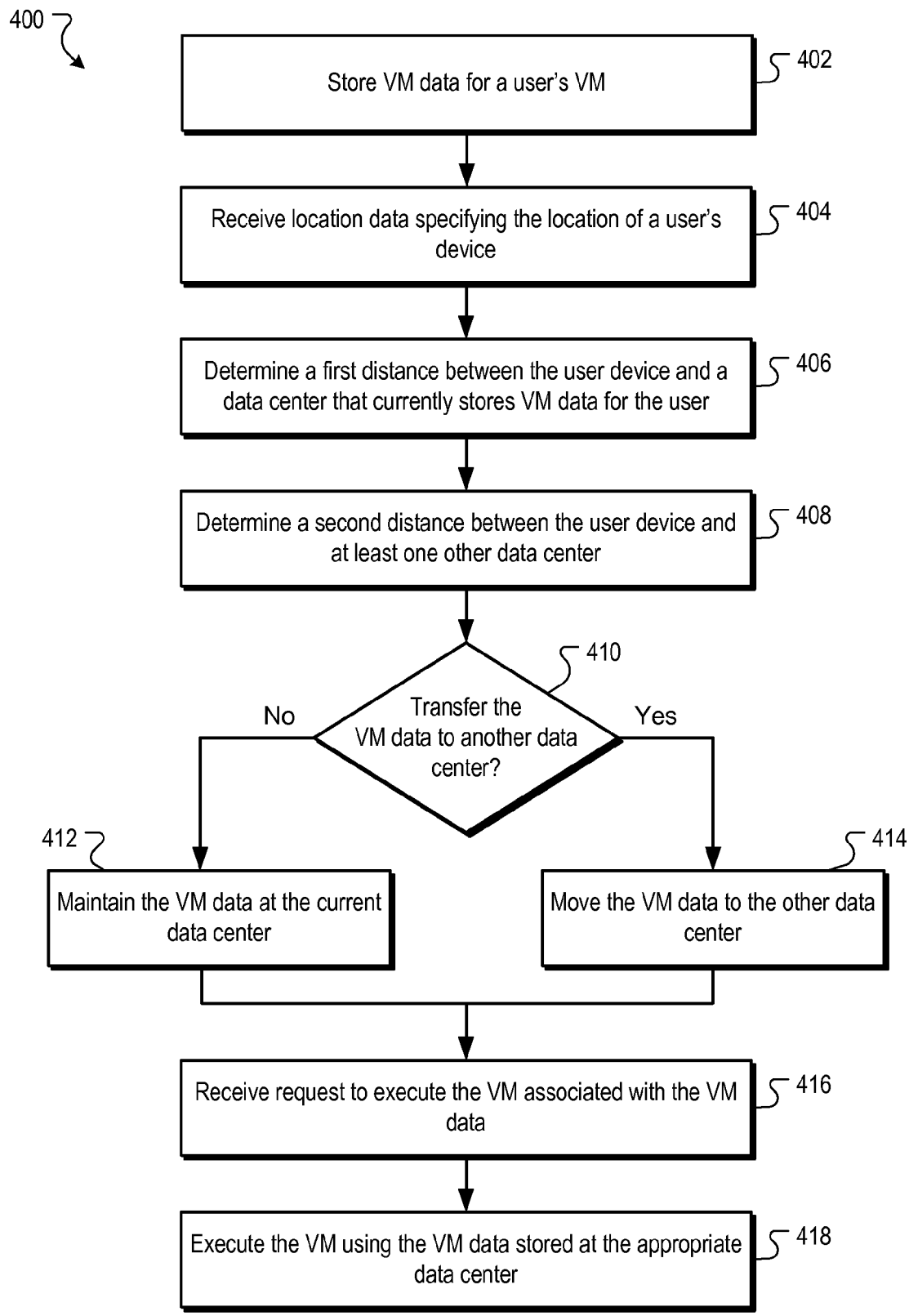
FIG. 4 is a flow chart of an example technique for transferring VM data and executing a VM using the VM data.

FIG. 4 is a flow chart of an example technique 400 for transferring VM data and executing a VM using the VM data. The example technique 400 is performed by a system of one or more computers. For example, the technique 400 may be performed by the VM data management system 160 of FIG. 1 and/or data centers 120-1-120-n of FIG. 1.

At block 402, the system stores VM data for a user's VM, e.g., a virtual desktop. The VM data may include one or more snapshots for the VM. The VM data for the user's VM may be stored at a data center that is located near the user. For example, the system may cause the VM data to be stored at the data center that is located closest to the user relative to other data centers that are eligible to store the VM data for the user.

When the user attempts to access the VM using a device, e.g., a computer, a VDI client executing on the device may submit a request to the system to access the VM. In response, the system may provide to the VDI client data that identifies the data center that currently stores the VM data. The VDI client may then access the VM data at the data center and also provide VM data to the data center. For example, periodically or at the conclusion of a VM session, the VDI client may send to the data center VM data, e.g., a snapshot of the VM, that allows the VM to be returned to the state of the VM at that time. The data center may then store the VM data in a VM data storage unit.

At block 404, the system receives location data specifying the location of the user's device. For example, a location application executing on the user's device may send the location data to the system. As described above, the location data may specify the location of the device and can be used as a proxy for the user's location.

At block 406, the system determines a first distance between the user's device and the data center that currently stores the VM data for the user's VM. For example, the system may determine the first distance using the location data received from the user's device and location data specifying the location of the data center that currently stores the VM data. The system may retrieve the location data for the data center from a data center location data storage unit.

At block 408, the system determines respective second distances for one or more other data centers that do not currently store the VM data. The second distance for a particular data center specifies the distance between the particular data center and the user's device. For example, the system may determine the second distance for each data center using the location data received from the user's device and location data specifying the location of the data center.

At block 410, the system determines whether to transfer the VM data from the data center that currently stores the VM data to another data center based at least on the first distance and the second distance for another data center. For example, system may determine to transfer the VM data if the user's device is determined to be closer to a different data center than the one that currently stores the VM data.

In some implementations, as described above, the system may also consider whether the user is traveling or has indicated a destination location to which the user intends to travel. If the user is traveling, the system may determine not to transfer the VM until the user has stopped traveling. In response to determining that the user has stopped traveling, the system may determine whether the user's device is closer to a different data center than the one that currently stores the VM data. If so, the system may determine to transfer the VM data to the closer data center.

If the user has indicated a destination location, the system may determine not to transfer the VM data to data centers other than the data center that is closest to the destination location. For example, the user may pass other data centers, or become closer to other data centers, while traveling to the destination location. Rather than unnecessarily transferring the VM data to each passed data center, the system may transfer the VM data to the data center that is located closest to the destination location. The system may transfer the VM data to the data center that is closest to the destination location in response to determining that the user's device is located at or near the destination location, that the user's device is located within a threshold distance of the destination location, that the user is currently traveling to the destination location, or that the user will be traveling to the destination location within a threshold amount of time, e.g., within an hour.

At block 412, if the system determines not to transfer the VM data, the system may maintain the VM data at the data center at which the VM data is currently stored.

At block 414, if the system determines to transfer the VM data to another data center, the system may cause the VM data to be transferred to the other data center. For example, the system may send a request to a server or other type of computer at the data center at which the VM data is currently stored. The request may cause the server to transfer the VM data from the data center at which the VM data is currently stored to the other data center.

In some implementations, after the VM data has been transferred from a first data center to a second data center, the VM data is removed from the first data center. This data removal provides more efficient memory usage. In some implementations, the VM data is maintained at the first data center after the transfer. This maintaining of the VM data may provide redundant data storage.

In implementations in which the VM data includes a snapshot of the VM, the snapshot may be transferred with the VM data. A template that can be used along with the snapshot may also be transferred with the VM data. In this way, both the template and the snapshot can be transferred to the user's computer more quickly from the data center that is located near the user than if the template and snapshot was transferred to the computer from the previous data center. In some implementations, templates for VMs may be stored at each data center to which VM data may be transferred. In such implementations, only the snapshot may be transferred as the template may already be stored at the data center that receives the snapshot.

At block 416, the system receives a request to execute the VM associated with the VM data. For example, the user may attempt to access the VM using the user's device. In response, the VDI client may send to the system a request to execute the VM.

At block 418, the VM is executed using the VM data stored at the appropriate data center. For example, the system may send to the VDI client data identifying the data center at which the VM data is stored. The VDI client may then interact with a server located at the data center to access the VM. In response, the server located at the data center may restore the VM to its previous state using the VM data and execute the restored VM. Once the VM is returned to its previous state, the VDI client can interact with the VM by way of the server and a VDI agent of the VM.

Embodiments of the subject matter and the operations described in this document can be implemented in digital electronic circuitry, or in computer software, firmware, or hardware, including the structures disclosed in this document and their structural equivalents, or in combinations of one or more of them. Embodiments of the subject matter described in this document can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this document can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this document can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this document can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this document, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
    periodically receiving location data from a mobile device of a user, the location data specifying a location of the mobile device;
    determining, based on the received location data, that the user is moving; and
    monitoring the location data indicating that the user is moving until a determination is made that the user's rate of location changes associated with the received location data does not exceed a threshold rate of location changes, and in response to the determination that the rate of location changes does not exceed the threshold:
        determining, using the location data, a first distance between the mobile device and a first data center that stores a virtual machine template and a snapshot associated with the user, the snapshot representing a state of a virtual machine;
        determining, using the location data, a second distance between the mobile device and a second data center that is different from the first data center;
        determining, based on the first distance and the second distance, that the mobile device of the user is closer to the second data center than the first data center; and
        in response to determining that the mobile device is closer to the second data center than the first data center, causing the snapshot to be transferred from the first data center to the second data center.

2. The method of claim 1, further comprising causing the virtual machine template to be transferred from the first data center to the second data center in response to determining that the mobile device is closer to the second data center than the first data center.

3. The method of claim 1, further comprising:
    receiving, from the mobile device, a request to remotely access a virtual desktop of the user executed on a virtual machine; and
    causing a server in the second data center to execute the virtual machine based at least in part on the snapshot transferred from the first data center;
    wherein the snapshot is transferred from the first data center to the second data center prior to receiving the request.

4. The method of claim 1, wherein receiving the location data specifying the location of the mobile device comprises receiving the location data from a special purpose application executing on the mobile device.

5. The method of claim 1, wherein the snapshot further comprises at least one of data stored by the virtual machine or data used by the virtual machine during a previous virtual machine session.

6. The method of claim 1, further comprising returning the virtual machine to the state using the snapshot and the virtual machine template.

7. The method of claim 1, further comprising:
receiving travel data specifying that the user is traveling to a destination location near the second data center;
receiving intermediate location data specifying an intermediate location of the user;
determining that the intermediate location is not within a threshold distance of the destination location; and
in response to receiving the travel data and determining that the intermediate location is not within the threshold distance of the destination location, determining not to transmit the snapshot to a third data center that is located closer to the intermediate location than the first data center and the second data center.

8. The method of claim 1, wherein in response to determining that the user's rate of location changes associated with a current location data is exceeds the threshold rate:
determining not to transmit the snapshot from the first data center to the second data center until receiving data indicating that the user's rate of location changes is less than the threshold rate.

9. The method of claim 1, wherein the snapshot comprises data for a virtual desktop.

10. A system comprising:
a data processing apparatus; and
a memory apparatus in data communication with the data processing apparatus and storing instructions executable by the data processing apparatus and that upon such execution cause the data processing apparatus to perform operations comprising:
periodically receiving location data from a computer of a user, the location data specifying a location of the computer;
determining, based on the received location data, that the user is moving; and
monitoring the location data indicating that the user is moving until a determination is made that the user's rate of location changes associated with the received location data does not exceed a threshold rate of location changes, and in response to the determination that the rate of location changes does not exceed the threshold:
determining, using the location data, a first distance between the computer and a first data center that stores a virtual machine template and a snapshot associated with the user, the snapshot representing a state of a virtual machine;
determining, using the location data, a second distance between the computer and a second data center that is different from the first data center;
determining, based on the first distance and the second distance, that the computer is closer to the second data center than the first data center; and
in response to determining that the computer is closer to the second data center than the first data center, causing the snapshot to be transferred from the first data center to the second data center.

11. The system of claim 10, wherein the operations further comprise causing the virtual machine template to be transferred from the first data center to the second data center in response to determining that the computer is closer to the second data center than the first data center.

12. The system of claim 10, wherein the location data is received from the computer.

13. The system of claim 10, wherein the location data is received from a mobile communication device of the user, the mobile communication device being different from the computer.

14. The system of claim 10, wherein the operations further comprise:
receiving, from the computer, a request to remotely access a virtual desktop of the user executed on a virtual machine; and
causing a server in the second data center to execute the virtual machine based at least in part on the snapshot transferred from the first data center;
wherein the snapshot is transferred from the first data center to the second data center prior to receiving the request.

15. The system of claim 10, wherein the operations further comprise:
receiving travel data specifying that the user is traveling to a destination location near the second data center;
receiving intermediate location data specifying an intermediate location of the user;
determining that the intermediate location is not within a threshold distance of the destination location; and
in response to receiving the travel data and determining that the intermediate location is not within the threshold distance of the destination location, determining not to transmit the snapshot to a third data center that is located closer to the intermediate location than the first data center and the second data center.

16. The system of claim 10, wherein in response to determining that the user's rate of location changes associated with a current location data is exceeds the threshold rate:
determining not to transmit the snapshot from the first data center to the second data center until receiving data indicating that the user's rate of location changes is less than the threshold rate.

17. A non-transitory computer storage medium encoded with a computer program, the program comprising instructions that when executed by data processing apparatus cause the data processing apparatus to perform operations comprising:
periodically receiving location data from a mobile device of a user, the location data specifying a location of the mobile device;
determining, based on the received location data, that the user is moving; and
monitoring the location data indicating that the user is moving until a determination is made that the user's rate of location changes associated with the received location data does not exceed a threshold rate of location changes, and in response to the determination that the rate of location changes does not exceed the threshold:
determining, using the location data, a first distance between the mobile device and a first data center that stores virtual machine data for the user;
determining, using the location data, a second distance between the mobile device and a second data center that is different from the first data center;
determining, based on the first distance and the second distance, that transmission of the virtual machine data between the mobile device and the second data center would be faster than transmission of the virtual machine data between the mobile device and the first data center; and in response to determining that the transmission of the virtual machine data between the mobile device and the second data center would be faster than transmission of the virtual machine data between the mobile device and the first data center, causing the virtual machine data to be transferred from the first data center to the second data center.

18. The non-transitory computer storage medium of claim 17, wherein the virtual machine data comprises a snapshot associated with the user, the snapshot representing a state of a virtual machine.

19. The non-transitory computer storage medium of claim 18, wherein:

the first data center stores a virtual machine template for the virtual machine; and the operations further comprise causing the virtual machine template to be transferred from the first data center to the second data center in response to determining that the transmission of the virtual machine data between the mobile device and the second data center would be faster than transmission of the virtual machine data between the mobile device and the first data center.

20. The non-transitory computer storage medium of claim 18, wherein the operations further comprise:

receiving, from the mobile device, a request to remotely access a virtual desktop of the user executed on a virtual machine; and causing a server in the second data center to execute the virtual machine based at least in part on the snapshot transferred from the first data center;

wherein the snapshot is transferred from the first data center to the second data center prior to receiving the request.

21. The method of claim 1, wherein causing the snapshot to be transferred from the first data center to the second data center comprises:

sending a prompt to the user requesting the transfer of the snapshot; and receiving a user input confirming the transfer.

* * * * *